C. KENNEDY.
Barbed Fences.
No. 153,965.   Patented Aug. 11, 1874.
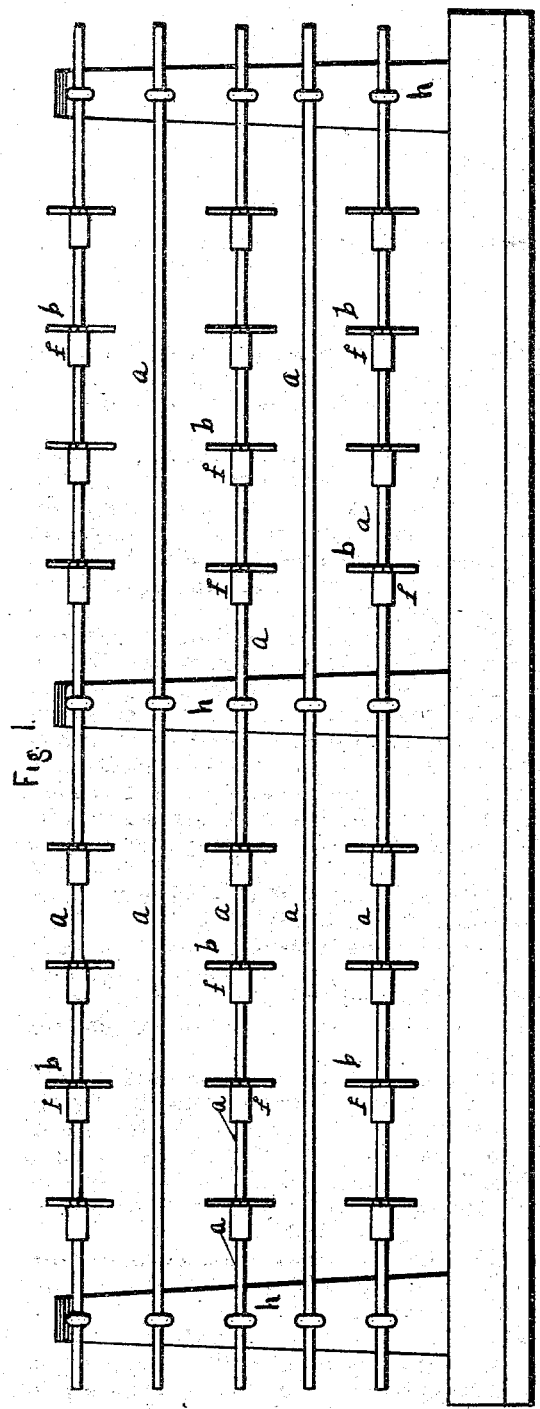
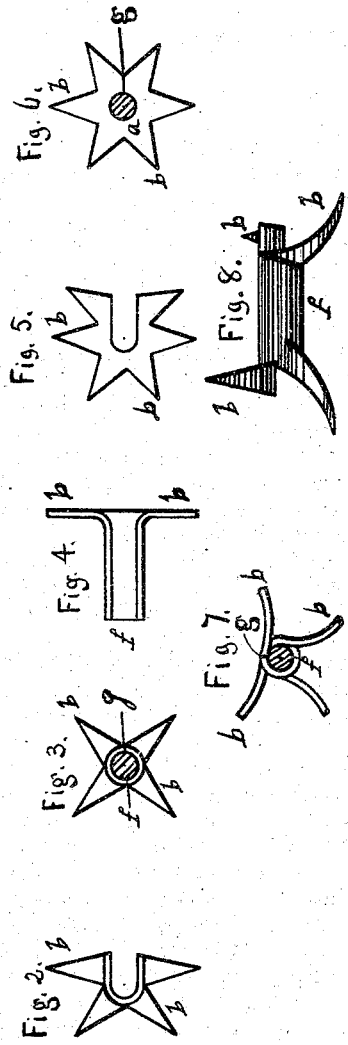
Witnesses
L. L. Bond
O. W. Bond
Inventor.
Charles Kennedy

UNITED STATES PATENT OFFICE.

CHARLES KENNEDY, OF HINCKLEY, ILLINOIS.

IMPROVEMENT IN BARBED FENCES.

Specification forming part of Letters Patent No. 153,965, dated August 11, 1874; application filed June 2, 1874.

*To all whom it may concern:*

Be it known that I, CHARLES KENNEDY, of the town of Hinckley, in the county of De Kalb and State of Illinois, have invented a new and useful Improvement in Wire Fences, of which the following is a full description, reference being had to the accompanying drawings, in which—

Figure 1 is an elevation, showing a fence with my improvement. Figs. 2, 3, and 4 are details. Figs. 5, 6, 7, and 8 show modified forms of the barb.

Wire fences are in common use. An objection to them is that cattle and horses rub against them or get their heads between the wires and break them down.

The object of my invention is to overcome this objection, which I accomplish by attaching to the wires a sufficient number of barbs of peculiar construction.

I am aware that devices have been used to keep cattle away from wire fences, but do not know that there is anything similar to my device.

In the drawings, *a a* represent the single wires in common use in wire fences, any suitable number of which may be used. *b b* represent the barbs attached to the wires. Fig. 2 is an end view, and Fig. 4 a side view, of one of these barbs ready to be attached to the wires. Fig. 3 is an end view, showing the barb secured to the wire. The barbs can most conveniently be made of sheet-iron, in the form of a star, having sharp points, and provided with an extension or socket, *f*, to be clasped upon the wire. The socket has a slit in one side, so that it can be placed on the wires after they have been secured to the posts *h*. These barbs or protectors can be readily fastened upon the wires by means of a pair of pinchers having suitable jaws. When attached to new wires, the wires can be slightly bent where the barbs or protectors are to be placed, which will prevent them from slipping, even if not very tightly secured. This, however, will not usually be necessary, and after the wires become a little rusty the barbs will remain where placed. If a fence have five wires, it will be sufficient to place the barbs on the second and fourth wires. If there are only three wires, then the barbs should be on all.

The stars may be made without the extension or socket, as represented in Figs. 5 and 6, but if so made will be more easily displaced. If the socket be omitted the center of the star will be provided with a hole, and a slit, *g*, will be made, as shown, to permit the star to be placed on the wire.

The barb or protector need not necessarily be made in the form of a perfect star, the object being simply to provide sharp points, against which the cattle will rub. The socket *f* might be provided with one or more points at each end, (see Figs. 7 and 8,) instead of a star at one end, the points at one end turning outward, while those at the other end turn inward, as shown. Another way would be to make several points at the end of the socket in any desired form, said points being turned in different directions.

A socket having the points located centrally can be used. The points or barbs in this case can easily be made from small wires permanently attached to the socket in any suitable manner.

The wires which are to receive the protectors might, when made or afterward, be slightly flattened at suitable intervals, by the use of propery machinery, for the purpose of more effectually preventing the barbs or protectors from slipping. This may be done or not, as may be deemed advisable.

Cattle and horses will soon learn to keep away from a wire fence provided with these barbs or protectors.

What I claim as new is as follows:

A barb having a lateral slit or opening, *g*, to enable the barb to be readily attached to the fence-wires, as and for the purpose specified.

CHARLES KENNEDY.

Witnesses:
 L. L. BOND,
 O. W. BOND.